(12) United States Patent
Augst (10) Patent No.: US 12,363,515 B2
(45) Date of Patent: Jul. 15, 2025

(54) METHOD FOR PROCESSING DATA IN CONNECTION WITH A VEHICLE, DECODING METHOD, CODING AND DECODING METHOD, SYSTEM, COMPUTER PROGRAM, AND COMPUTER PROGRAM PRODUCT

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 982 days.

(21) Appl. No.: 16/957,168

(22) PCT Filed: May 7, 2019

(86) PCT No.: PCT/EP2019/061616
§ 371 (c)(1),
(2) Date: Jun. 23, 2020

(87) PCT Pub. No.: WO2019/223994
PCT Pub. Date: Nov. 28, 2019

(65) Prior Publication Data
US 2020/0351632 A1    Nov. 5, 2020

(30) Foreign Application Priority Data

May 22, 2018 (DE) ..................... 10 2018 207 950.1

(51) Int. Cl.
*H04W 4/46* (2018.01)
*G07C 5/00* (2006.01)
(Continued)

(52) U.S. Cl.
CPC .............. *H04W 4/46* (2018.02); *G07C 5/008* (2013.01); *G07C 5/02* (2013.01); *G07C 5/0808* (2013.01);
(Continued)

(58) Field of Classification Search
CPC .......... H04W 4/46; H04L 65/61; G07C 5/008; G07C 5/02; G07C 5/0808; G07C 5/0816; G07C 5/0891
See application file for complete search history.

(56) References Cited

U.S. PATENT DOCUMENTS 6,484,858 B1 * 11/2002 Mimura ................ F16D 41/061
192/89.26
7,661,408 B2 * 2/2010 Kassner ................ F02D 41/009
123/435
(Continued)

FOREIGN PATENT DOCUMENTS

| CN | 103680138 A | 3/2014 |
| CN | 104364629 A | 2/2015 |

(Continued)

OTHER PUBLICATIONS

Chinese-language Office Action issued in Chinese Application No. 201980006704.0 dated Oct. 9, 2021 with English translation (24 pages).
(Continued)

*Primary Examiner* — Dominic E Rego
(74) *Attorney, Agent, or Firm* — Crowell & Moring LLP (57) ABSTRACT

The invention relates to processing data in connection with a vehicle. The processing includes determining change data characterizing a change in one or more variables in the vehicle. The processing further includes determining a spectral distribution, in particular a spectral distribution function, on the basis of the sensed or acquired change data of the one
(Continued)

or more variables in the vehicle. The processing further includes providing the data on the basis of the determined spectral distribution for use outside the vehicle.

19 Claims, 3 Drawing Sheets

(51) Int. Cl.
    *G07C 5/02*           (2006.01)
    *G07C 5/08*           (2006.01)
    *H04L 65/61*         (2022.01)

(52) U.S. Cl.
    CPC ......... *G07C 5/0816* (2013.01); *G07C 5/0891* (2013.01); *H04L 65/61* (2022.05)

(56) References Cited

U.S. PATENT DOCUMENTS

| | | | |
|---|---|---|---|
| 8,930,097 B2* | 1/2015 | Vandekerkhove | B60T 8/172 701/51 |
| 10,259,340 B1* | 4/2019 | Wolf | B60L 15/007 |
| 2001/0002587 A1* | 6/2001 | Walter | F02D 41/009 123/90.15 |
| 2004/0113617 A1* | 6/2004 | de Swiet | G01R 33/34069 324/303 |
| 2008/0208430 A1* | 8/2008 | Klein | F02P 5/1516 701/115 |
| 2009/0112449 A1* | 4/2009 | Binder | F02D 41/403 701/111 |
| 2009/0138130 A1* | 5/2009 | Aigner | B60R 16/03 700/282 |
| 2010/0145567 A1 | 6/2010 | Bian et al. | |
| 2010/0228533 A1* | 9/2010 | Cummings | G06F 30/15 701/2 |
| 2011/0127097 A1* | 6/2011 | Hodzic | B60K 28/16 180/197 |
| 2011/0130937 A1* | 6/2011 | Krueger | B60W 10/08 303/152 |
| 2011/0257845 A1* | 10/2011 | Niki | B62D 5/0472 701/41 |
| 2011/0276203 A1* | 11/2011 | Hase | B61L 23/047 701/19 |
| 2012/0130616 A1* | 5/2012 | Caspari | B60W 30/18172 701/70 |
| 2012/0277966 A1* | 11/2012 | Herges | B60T 8/175 701/74 |
| 2013/0018541 A1* | 1/2013 | Raz | B60W 40/09 701/29.1 |
| 2013/0246016 A1* | 9/2013 | Fertig | G06N 5/00 703/2 |
| 2013/0312524 A1 | 11/2013 | Mian et al. | |
| 2014/0257664 A1* | 9/2014 | Arbitmann | B60T 8/17551 701/71 |
| 2015/0185036 A1 | 7/2015 | Braeuchle et al. | |
| 2015/0191158 A1* | 7/2015 | Vorreiter | B60T 8/175 701/72 |
| 2015/0331060 A1* | 11/2015 | Eifert | G01R 31/374 320/132 |
| 2015/0351190 A1* | 12/2015 | Walters | H05B 45/28 315/186 |
| 2016/0006378 A1* | 1/2016 | Allan | B60L 3/106 318/13 |
| 2016/0203652 A1 | 7/2016 | Throop et al. | |
| 2016/0221584 A1* | 8/2016 | Fendt | B60W 50/04 |
| 2016/0339779 A1* | 11/2016 | Lauffer | B60K 17/344 |
| 2016/0355167 A1* | 12/2016 | Erban | B60L 7/26 |
| 2016/0375907 A1* | 12/2016 | Erban | B60W 20/12 701/99 |
| 2017/0115120 A1* | 4/2017 | Augst | G01C 7/04 |
| 2017/0183010 A1* | 6/2017 | Theel | F02N 5/04 |
| 2017/0243412 A1* | 8/2017 | Deville | G06F 11/3013 |
| 2017/0305424 A1* | 10/2017 | Augst | F02D 41/1406 |
| 2018/0072181 A1* | 3/2018 | Christen | H01M 10/625 |
| 2018/0091010 A1* | 3/2018 | Mackowiak | H02K 1/28 |
| 2018/0111623 A1 | 4/2018 | Augst | |
| 2018/0170425 A1* | 6/2018 | Jung | B62D 7/159 |
| 2018/0209798 A1 | 7/2018 | Jurk | |
| 2018/0215269 A1* | 8/2018 | Alam | B60L 53/24 |
| 2018/0244257 A1* | 8/2018 | Kneitz | B60W 10/06 |
| 2019/0023130 A1* | 1/2019 | Garcha | B60L 53/14 |
| 2019/0047549 A1* | 2/2019 | Johri | B60K 6/387 |
| 2019/0054924 A1* | 2/2019 | Ambruzs | B60T 8/1706 |
| 2019/0193696 A1* | 6/2019 | Flaum | B60T 8/1766 |
| 2020/0130666 A1* | 4/2020 | Izumoto | B60T 8/42 |
| 2021/0331736 A1* | 10/2021 | Zientek | B62D 15/0215 |

FOREIGN PATENT DOCUMENTS

| | | |
|---|---|---|
| CN | 104584084 A | 4/2015 |
| CN | 104908688 A | 9/2015 |
| CN | 107730895 A | 2/2018 |
| CN | 107850452 A | 3/2018 |
| DE | 10 2006 057 342 A1 | 6/2008 |
| DE | 10 2008 051 593 A1 | 4/2010 |
| DE | 10 2014 213 326 A1 | 1/2016 |
| DE | 10 2016 100 302 A1 | 7/2016 |
| DE | 10 2015 211 892 A1 | 12/2016 |
| DE | 10 2015 211 894 A1 | 12/2016 |
| WO | WO 2013/074867 A2 | 5/2013 |

OTHER PUBLICATIONS

International Search Report (PCT/ISA/210) issued in PCT Application No. PCT/EP2019/061616 dated Aug. 16, 2019 with English translation (six (6) pages).

German-language Written Opinion (PCT/ISA/237) issued in PCT Application No. PCT/EP2019/061616 dated Aug. 16, 2019 (eight (8) pages).

German-language Search Report issued in German Application No. 10 2018 207 950.1 dated Apr. 7, 2020 with partial English translation (11 pages).

English translation of Chinese Office Action issued in Chinese Application No. 201980006704.0 dated Mar. 25, 2022 (nine (9) pages).

* cited by examiner

Fig 1

METHOD FOR PROCESSING DATA IN CONNECTION WITH A VEHICLE, DECODING METHOD, CODING AND DECODING METHOD, SYSTEM, COMPUTER PROGRAM, AND COMPUTER PROGRAM PRODUCT

BACKGROUND AND SUMMARY OF THE INVENTION

The disclosed subject matter relates to a method for processing data in connection with a vehicle. The disclosed subject matter also relates to a decoding method. The disclosed subject matter also relates to an encoding and decoding method. The disclosed subject matter also relates to a system, to a computer program and to a computer program product.

The object on which the disclosed subject matter is based is to provide a method and a system which contribute to processing or providing data in connection with a vehicle in a particularly efficient way.

The object is achieved by means of the features of the independent patent claims. Advantageous refinements are characterized in the dependent claims.

The disclosed subject matter is distinguished by a method for processing data in connection with a vehicle. The disclosed subject matter is also distinguished by a system which corresponds to the method for processing data in connection with a vehicle. The method comprises:
  determining change data characterizing a change in one or more variables in the vehicle,
  determining a spectral distribution, in particular a spectral distribution function, on the basis of the acquired change data of the one or more variables, in the vehicle,
  providing the data on the basis of the determined spectral distribution of the use outside the vehicle.

The determination of the spectral distribution permits data which is in itself extremely extensive, such as the change data, to be converted to a very compact form.

Said variables are, in particular, variables which vary dynamically and/or continuously. They can be determined in the vehicle, in particular from a system of the vehicle on-board power system, in particular continuously. The change data can be characteristic of a continuous and/or quantitative change in one or more variables. These can represent an essentially continuous change function of the one or more variables. The change data can represent a dynamic change or a dynamic profile of the variable values with respect to time and/or space. They can preferably be analog variables which represent, in particular, quantitative values of an analog process, e.g. of a physical process.

The spectral distribution (also to be understood as data characterizing or comprising the spectral distribution) can, for example, subsequently be transmitted, for example to a server, e.g. to a backend and/or to a vehicle, for example in the form of a continuous transmission as a data stream. In particular, the transmission comprises a wireless transmission in the form of a plurality of data packets.

Alternatively or additionally, the spectral distribution can subsequently be provided or permanently stored inside the vehicle and/or outside the vehicle.

In particular, the spectral distribution can be further processed and, if appropriate, provided in a further-processed form, e.g. aggregated with further data. For example, a vehicle functionality of a vehicle can be operated on the basis of the at least one spectral distribution (essentially with real-time capability or at a later time). In this context, for example a variable in a further vehicle, in particular a variable which effects the longitudinal dynamics, lateral dynamics or vertical dynamics of the vehicle, can be controlled in accordance with at least one spectral distribution, preferably a plurality of spectral distributions from different times and/or vehicles. For example, an actuator of a vehicle can be controlled on the basis of the at least one spectral distribution.

The spectral distribution is determined, in particular, by means of a time-discrete Fourier analysis, in particular by means of a Fourier transformation. The Fourier transformation refers here in a summarizing fashion to a method of Fourier analysis which permits continuous, aperiodic signals to be decomposed into one continuous spectrum. The function which describes this spectrum is also referred to as a Fourier transform or spectral function. Essentially the determination of the spectral distribution comprises the formation of a spectral function preferably with discrete forms of the Fourier analysis, for example by means of a fast Fourier transformation (FFT), a cosine transformation and/or a modified discrete cosine transformation (MDCT), in particular resolved according to space and/or time.

According to one advantageous refinement, the one or more variables in the vehicle are characteristic of an operating parameter and/or an input variable and/or an internal state and/or an output variable of a functionality of the vehicle.

One said input variable can represent e.g. one or more signals for operating a functionality of the vehicle. One said output variable can represent e.g. an, in particular continuous, physical process which is controlled by a functionality of the vehicle.

According to a further advantageous refinement, the change data comprises a function of one or more variables on the basis of a variable representing time and/or a variable representing space and/or a variable representing one or more events, for example a sequence of a plurality of events.

In this context, said spectral distribution can also be determined in relation to a variable, wherein the variable represents space information and/or time information.

A combination of a plurality of spectral distributions which are determined in accordance with the same or different type or class of the respective variable is also advantageous. The at least one spectral distribution can be at least partially representative of a spatial frequency distribution and/or another can be representative of a time frequency distribution. The determination of at least one spectral distribution which is representative of a spatial frequency distribution, on the basis of a spectral distribution which is representative of a time frequency distribution, or vice versa, is also advantageous, e.g. in a backend computer.

According to a further advantageous refinement, said change data characterizes a mathematical relationship between at least two different variables in connection with a vehicle functionality.

Said mathematical relationship can characterize or represent a predefined mathematical law, rule, specification and/or relation, e.g. between one or more of the corresponding said variables (also to be understood as corresponding values of the variables or as changes in said variables). The mathematical relationship can represent here coefficients for one or more, in particular previously determined, equations, polynomials or for a simulation. The relationship is preferably an expediently defined mathematical relationship. For example, the mathematical relationship, or mainly a mathematical relationship of said parameters, may not represent the variables themselves, or may only do so in a reduced form. In particular, the mathematical relationship can characterize or represent the one gradients of a first variable and/or of a second variable according to a space-related variable (relative variables e.g. distance, spacing and/or absolute variables, e.g. specific position sequence) and/or according to a time-related variable (relative variables, e.g. time intervals and/or absolute variables such as e.g. a sequence of specific points in time). In a simplified case, the mathematical relationship can comprise an assignment or an assignment rule between one or more first variables and one or more second variables. The mathematical relationship or the assignment can preferably be related to specific boundary conditions, for example value ranges of one or more parameters of the boundary conditions in the vehicle. In a simplified case, a mathematical relationship can also characterize a proportion between at least one first variable and one second variable.

According to a further advantageous refinement, the spectral distribution of a first variable in the vehicle is determined in relation to a second variable in the vehicle.

According to a further advantageous refinement, the at least one first variable characterizes an output variable, and the at least one second variable characterizes an input variable of at least one functionality.

This therefore makes it possible for information characterizing the execution of a functionality of the vehicle, e.g. its performance, to be processed, transferred and/or provided in a very efficient way.

For example, a vehicle function of an output variable (of one or more corresponding variables) of a vehicle function of the input variable (of one or more corresponding variables) can be formed. In this context, the Fourier analysis, e.g. a modified, time-discrete cosine transformation (MDCT) can be executed according to the input variable. The result therefore has an extremely compressed form. Furthermore, despite a very small quantity of data, the indicators included therein or the statement about the method of functioning of the vehicle function is very largely included.

In particular, the at least one spectral distribution can be determined and provided in such a way that it represents learning data, in particular for what is referred to as machine learning, or is used as such.

In the method it is possible to determine and handle (extremely compact) learning data in the form of the at least one spectral distribution. For example, the method can also comprise the transfer of learning data, determined in the form of a spectral distribution, e.g. on the basis of the variable of at least one first vehicle, to a second vehicle.

The spectral distribution, in particular as data based on the spectral distribution, can be transferred in real time, e.g. from/to an infrastructure device or directly or indirectly from one vehicle to another vehicle (car-to-car). This data can therefore be used approximately in real time to operate, e.g. to parameterize, precondition, control, a vehicle function. In this context, a real-time capability which is necessary to operate the vehicle functionality can be firstly provided by determining the spectral distribution.

The parameterization, preconditioning or control of a vehicle function can subsequently also be carried out predictively.

According to a further advantageous refinement, the at least one variable relates to a parameter characterizing an operator control action of the driver of the vehicle, in particular relating to a specification for a movement of the vehicle.

In this context, the at least one variable can characterize a qualitative and/or quantitative parameter of an operator control action of the user, in particular driver.

The at least one variable, e.g. said first variable and/or second variable, relate e.g. to:
a so-called trace (e.g. of an on-board power system of the vehicle) of an operating variable in connection with a vehicle function,
trace of an operating variable in conjunction with an environmental model,
profile of an operating variable or output variable of an, in particular intelligent, learning sensor,
profile of an operating variable in a driver assistance function,
profile of an operator control action, in particular chronological function or spatial function of a driver operator control action, in particular steering and/or activation of a pedal.
profile of a variable in connection with a route profile, in particular the altitude of a local carriageway and/or curvature of a carriageway,
profile of transverse forces which act on a vehicle when it travels along a section of a route, which are preferably standardized according to a respective speed value of the vehicle,
profile of a local coefficient of friction,
profile of what is referred to as a wheel slip of at least one wheel of the vehicle,
profile of a local temperature of the carriageway,
profile of at least one mechanical force which acts on a component of the chassis of the vehicle.

The at least one variable can be a vehicle-internal variable which characterizes at least one process (which is not directly affected or cannot be quickly influenced by the external world) in the vehicle. For example, the at least one variable can characterize a physical and/or chemical process, e.g. an energy conversion process. Therefore, the quantitative changes (which are typical of such processes) can be registered.

According to a further advantageous refinement, the spectral distribution is assigned to position information by means of a predefined coordinate system, specifically in such a way that at least one variable which represents the spatial information is assigned to a length, in relation to a direction essentially along a profile of a route, and/or to a width, in relation to a direction essentially perpendicular to a profile of a route.

The position information can comprise a position of a route section in a global coordinate system, e.g. GPS, Galileo etc. Furthermore, the position information can also preferably comprise an orientation within the route section in relation to a global coordinate system or according to compass directions etc. The position information can, for example, also additionally comprise a position and/or orientation of a respective local physical property in relation to lane markings and/or infrastructure devices (e.g. crash barriers), in particular within a route section, which relate here, in particular, to one or more salient points and/or lines and/or shapes of the route section. For example, this information can also comprise a relative position with a reference to the lane center of a section of road.

In this context, for example a variable which represents the spatial information can specify the spatial information essentially along a center line of a carriageway marking. Another variable which represents the spatial information can specify, for example, the spatial information in accordance with the distance of each point essentially perpendicular to this center line.

A "variable which represents the spatial information" can comprise, in particular (per se) no reference to a specific position. It can be, for example, information in distance units, for example in distance units such as "running meters". Such a "variable which represents the spatial information" can be any unit which relates to the space, for example in a three-dimensional fashion, two-dimensional fashion (longitudinal direction and/or transverse direction) or unidimensional fashion.

Alternatively or additionally, a relative position can be determined in the predefined coordinate system and further processed, wherein the predefined coordinate system preferably relates to a corresponding section of a route. The predefined coordinate system and/or the position information can be determined or processed, for example, into a spatial relation of a local physical carriageway property with respect to a longitudinal direction or transverse direction of a section of a route within a road and/or lane.

In particular, the predefined coordinate system is obtained by means of interpolation from predetermined points or points which are determined by means of a predetermined method. The points of a predetermined type can be e.g. salient points, e.g. apex points or arc radii or arc center points of bends in roads. The interpolation can be e.g. an interpolation which is linear in certain parts or an interpolation of the second or third order or particularly preferably a spline interpolation.

According to a further advantageous refinement, the spectral distribution is assigned to the position information which characterizes, in particular, a corresponding position. For example, a determined spectral distribution which, in particular, does not depend per se on a position can be assigned to a specific corresponding position, e.g. to the position at which it has occurred.

Alternatively or additionally, a spectral distribution can be determined by determining a spectral distribution function on the basis of the spectral distribution and the position information. In this context, a variable which represents the spatial information can be assigned as an argument to a predefined coordinate system (for example a coordinate system according to one or more features described in this document).

The spectral distribution function can therefore represent the spectral distribution in accordance with the variable which represents the spatial information.

Analogously to spectral distribution, the spectral distribution function can also be representative of a spatial frequency distribution function and/or a time frequency distribution function.

In this context, the spectral distribution function can be determined by means of a Fourier transformation which represents the spectral distribution with the assigned position information.

Alternatively or additionally, the spectral distribution can also comprise a distribution of a plurality of predefined frequency components, preferably previously determined elementary functions within the change data. In this case, a weighting of the distribution of the change data can also be associated with the spectral distribution. In this context it is not absolutely necessary to determine a spectral distribution function. In this configuration variant, the change data can be assigned to a spectral distribution which permits a distribution of specific properties of the change data in an extremely compact form. In this context, this data can be assigned to the corresponding variables during its later processing and use.

According to a further advantageous refinement
a similarity measure between one or more data sections of the change data with respect to one or more predefined patterns is determined, which data sections are representative of predefined change patterns, and
the data section is assigned to one of the predefined patterns in accordance with the determined similarity measure.

In this context, a data section can be representative of a portion of the change data, for example a geometric area of a section of a route and comprise e.g. 10 cm-10 meters.

The similarity measure can comprise a similarity of a represented physical form of a location within the section of route. Such an, in particular salient, data section can correspond e.g. to one of a plurality of typical forms of a typical uneven portion of a roadway, e.g. to a boundary between concrete slabs, a beveled edge of a roadway etc. or even to a profile of a curb stone or of a crash barrier.

The assignment of the data section to predefined patterns is preferably carried out in accordance with the maximum determined similarity measure, e.g. when similarity measures of a data section and a plurality of patterns which are available for selection are compared.

According to a further advantageous refinement, the determination of the spectral distribution, in particular of the spectral distribution function, is carried out within the scope of a predefined audio standard.

The system has, for this, in particular a device for compressing audio data in a predefined audio format, which is designed to process the change data.

In this context, within the scope of the determination of the spectral distribution it is possible, for example, to modify data in such a way that a space-related function is assigned to time information in accordance with a defined assignment, preferably in such a way that a length is assigned to time units in a specific proportion, and/or the resulting time information is processed and/or stored by means of one or more devices.

Time information can comprise, in particular, (per se) no reference to an absolute time, e.g. time of day. There can be, for example, information in units of time, for example in distance units such as "running seconds".

The predefined audio standard comprises, for example, what are referred to as MP3 or similar audio standards. In such audio standards, the storage, processing and also wireless transmission of files is extremely favorable because the corresponding standards are established and because the encoders and decoders are also now very favorable as hardware and there is maximum compatibility, e.g. even with mobile radio, internet platforms and interfaces.

For example, what is referred to as MP3 streaming is standardized, industrialized and has a high level of compatibility with respect to its provision and handling, which offers advantages in terms of the handling, in particular, (continuous) provision of the spectral distributions.

According to a further advantageous refinement, the spectral distribution is determined in such a way that it represents multi-channel data, wherein one channel of the multi-channel data is representative of a change in a first variable, and one channel is representative of a change in a second variable.

In particular, at least two of the channels of said multi-channel data can be occupied with at least two of the following types of data:

input variable of a functionality of the vehicle,
operating variable of a functionality of the vehicle,
output variable of a functionality of the vehicle,
parameter of an operator control action of a user of the vehicle,
parameter of a state of the user,
parameter of an influencing variable which influences the vehicle.

In this context change data can relate to an input variable, state variable, output variable of the same functionality of the vehicle or at least to two different functionalities of the vehicle.

The at least one parameter of an operator control action, of the state of the user and/or of an influencing variable which influences the vehicle can also be assigned to the change data of an input variable, state variable or output variable which is essentially valid in the same short time interval.

In this context, at least two channels of the multi-channel data can be occupied by the at least two variables in such a way that they each represent variable values which are chronologically and/or causally assigned to one another.

According to a further advantageous refinement, the determination of the spectral distribution is carried out within the scope of a predefined video standard.

As a result, a very detailed, multi-dimensional and at the same time very compact illustration of the spectral distribution can be achieved.

The predefined video standard comprises, for example, MPEG, MP4 or similar video standards. Instead of pixel values, for example the respective variable is encoded. For example as is the case with MP4, only the differences within the variable are encoded. Instead of RGB pixel parameters it is possible to process e.g. one, two and/or three different variables as the corresponding change data. The data packets that are determined in the process correspond here to none of the multimedia contents which can be seen by a human or directly perceived.

For this, the system has, in particular, a device based on a device for compressing video data in a predefined video format, wherein the device is designed to process the change data. In other words, a silicon chip or an IP or a device in the vehicle can be developed or configured to perform audio or video compression and/or streaming of multimedia data in order to execute the method. In this context, the system according to the disclosed subject matter comprising such a device can be designed to read in one or more variables in the vehicle, to determine change data of the variables and to determine a spectral distribution, in particular a spectral distribution function, and, if appropriate, to stream to and/or from the vehicle.

According to a further advantageous refinement,
change data which is reduced on the basis of a profile of the change data is determined by setting the quantization of the change data and/or the number of data items of the change data which are assigned to a unit of time, or to a spatial unit, on the basis of the profile of the change data, and
the spectral distribution is determined on the basis of the reduced change data.

In this context, it is possible that data sections of the change data which correspond, for example, to only slight changes (which are below a certain threshold) of a respective variable, have less precise resolution or quantization, e.g. as data sections of the change data which corresponds to a change in the at least one variable which exceeds a certain threshold value. The last-mentioned data sections can have (at least comparatively) precise resolution and/or quantization. As result, a further data reduction can be achieved. It is also possible that only, or predominantly only data sections of the change data which exhibit continuous (non-sudden) change by at least a threshold of one or more respective variables to be processed in accordance with one or more features of the method.

According to a further advantageous refinement,
reduced change data is determined on the basis of at least one or more predefined thresholds, in that data which is representative of less-relevant physical changes in the one or more variables is removed from the change data or replaced by a predefined value, and—the spectral distribution is determined on the basis of the reduced change data.

Such thresholds can correspond e.g. to specific threshold values, patterns or signal parameters of the one or more variables in the vehicle.

As a result, a further pronounced reduction in the quantity of data can be achieved and there can be a saving in hardware performance in the vehicle.

According to a further advantageous refinement, one or more thresholds correspond to one or more perceptibility thresholds, wherein at least two thresholds are different for different spectral components.

According to a second aspect, the disclosed subject matter is distinguished by a decoding method. The disclosed subject matter is also distinguished by a system which corresponds to the decoding method. A spectral distribution is provided, in particular streamed, on the basis of change data of at least one vehicle. The change data which is assigned to the spectral distribution and which is representative of a change in one or more variables in the vehicle, in particular functional parameters and/or input variables and/or internal variables and/or output variables, is determined on the basis of the spectral distribution.

As a result, the spectral distribution can easily be further processed, for example in order to use the data of the spectral distribution for driver assistance systems and/or for other functions already described. Through the streaming, that is to say the provision "bit by bit" it is possible to make the provision essentially real-time capable.

According to a third aspect, the disclosed subject matter is distinguished by an encoding and decoding method. The disclosed subject matter is also distinguished by a system which corresponds to the encoding and decoding method. A method according to the first aspect or according to an advantageous refinement of the first aspect is carried out. The spectral distribution is provided, in particular streamed. The change data which is assigned to the spectral distribution and which is representative of a change in one or more variables in the vehicle, in particular functional parameters and/or input variables and/or internal variables and/or output variables, is determined on the basis of spectral distribution.

According to one advantageous refinement, the spectral distribution is provided to a second vehicle, in particular as a stream.

In particular, in this way essentially real-time capable transmission of the signal distributions can be carried out on the basis of the change data. This can in particular also be expanded with the valuable change data by what is referred to as car-to-car or car-to-X communication.

According to one advantageous refinement, the spectral distributions of a plurality of first vehicles are aggregated, and data on the basis of the aggregated spectral distributions is provided for one or more second vehicles.

In the second vehicle, for example at least one of the following method steps is carried out in accordance with the spectral distribution:

active control of vertical-dynamic damping and/or acceleration effect on the passenger cell of the second vehicle, and/or the forces of the steering wheel feedback or coupling of the second vehicle are changed, and/or at least partially automatic longitudinal guidance and/or lateral guidance of the second vehicle are/is changed.

According to a further aspect, the disclosed subject matter is distinguished by a computer program, wherein the computer program is designed to carry out the method for processing data in connection with a vehicle or an advantageous refinement of the method for processing data in connection with a vehicle, the encoding method or an advantageous refinement of the encoding method, and/or the encoding and decoding method or an advantageous refinement of the encoding and decoding method, on a data processing device.

According to a further aspect, the disclosed subject matter is distinguished by a computer program product which comprises executable program code, wherein when executed by a data processing device the program code executes the method for processing data in connection with a vehicle or an advantageous refinement of the method for processing data in connection with a vehicle, the encoding method or an advantageous refinement of the encoding method, and/or the encoding and decoding method or an advantageous refinement of the encoding and decoding method.

The computer program product comprises, in particular, a medium which can be read by the data processing device and in which the program code is stored.

According to a further aspect of the disclosed subject matter, all or a plurality of significant steps of the method are carried out within a vehicle or a plurality of vehicles.

Within the scope of the disclosed subject matter, the vehicle is preferably a motor vehicle or motorcycle. Therefore, a plurality of advantages as discussed above and a plurality of further advantages which can be followed by a person skilled in the art are obtained. The vehicle can also be a watercraft, wherein part of the sea floor and/or of the water layers correspond to the route which can be used, e.g. economically. The vehicle can also be an aircraft or spacecraft, wherein the corresponding route is part of a surface of a planet, atmospheric layers or of the layers of a planet. In addition, the vehicle can be an agricultural vehicle or a construction machine. In this context, the one variable can (alternatively or additionally) characterize, for example, a condition of one or more layers of earth.

Example embodiments of the disclosed subject matter are explained in more detail below without limitation of the generality on the basis of the schematic drawings. These example embodiments can be freely combined with further features of the disclosed subject matter and are advantageous.

DETAILED DESCRIPTION OF THE DRAWINGS

Figure 1:
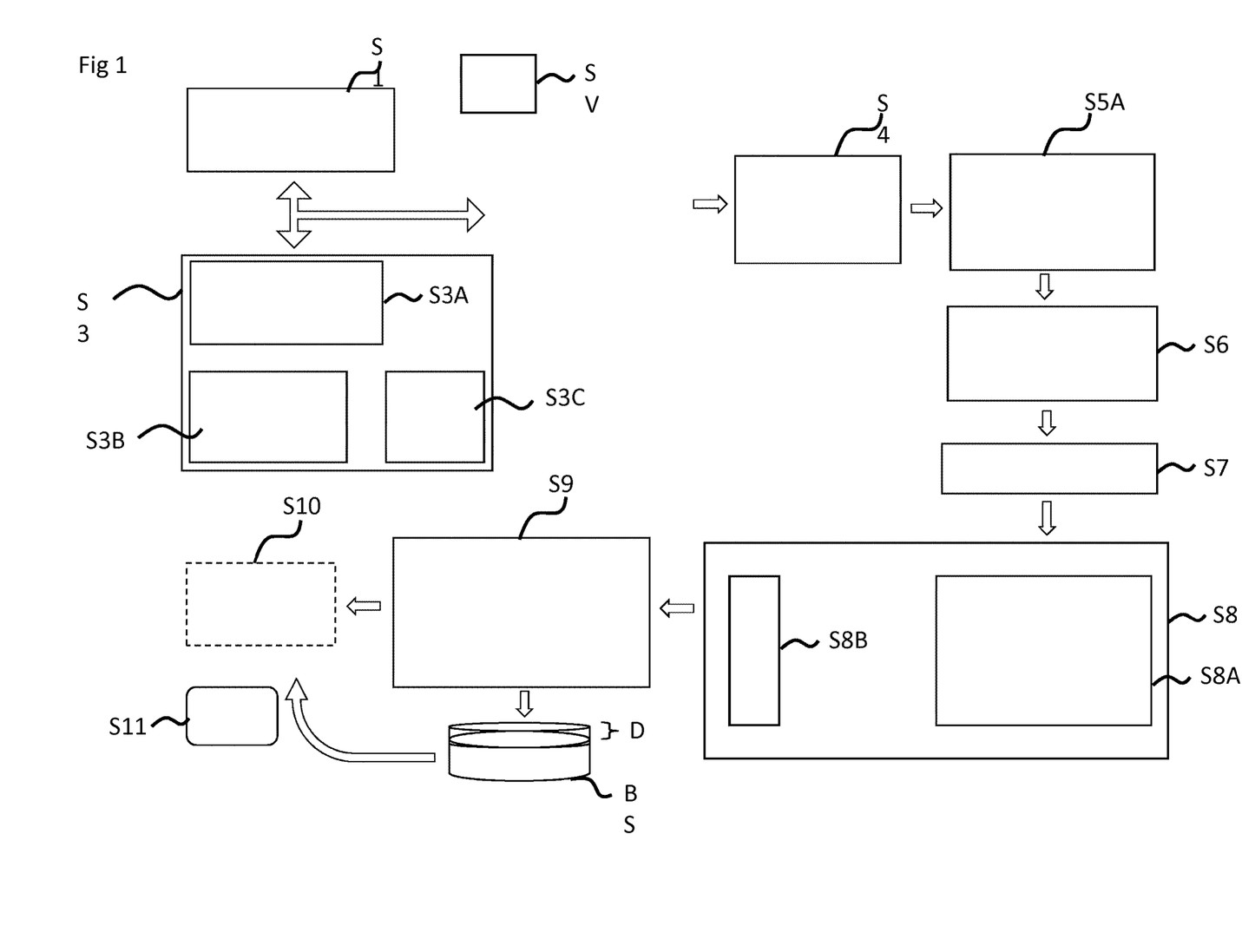
FIG. 1 shows a flowchart of a first example of a program for encoding and decoding.
Figure 2:
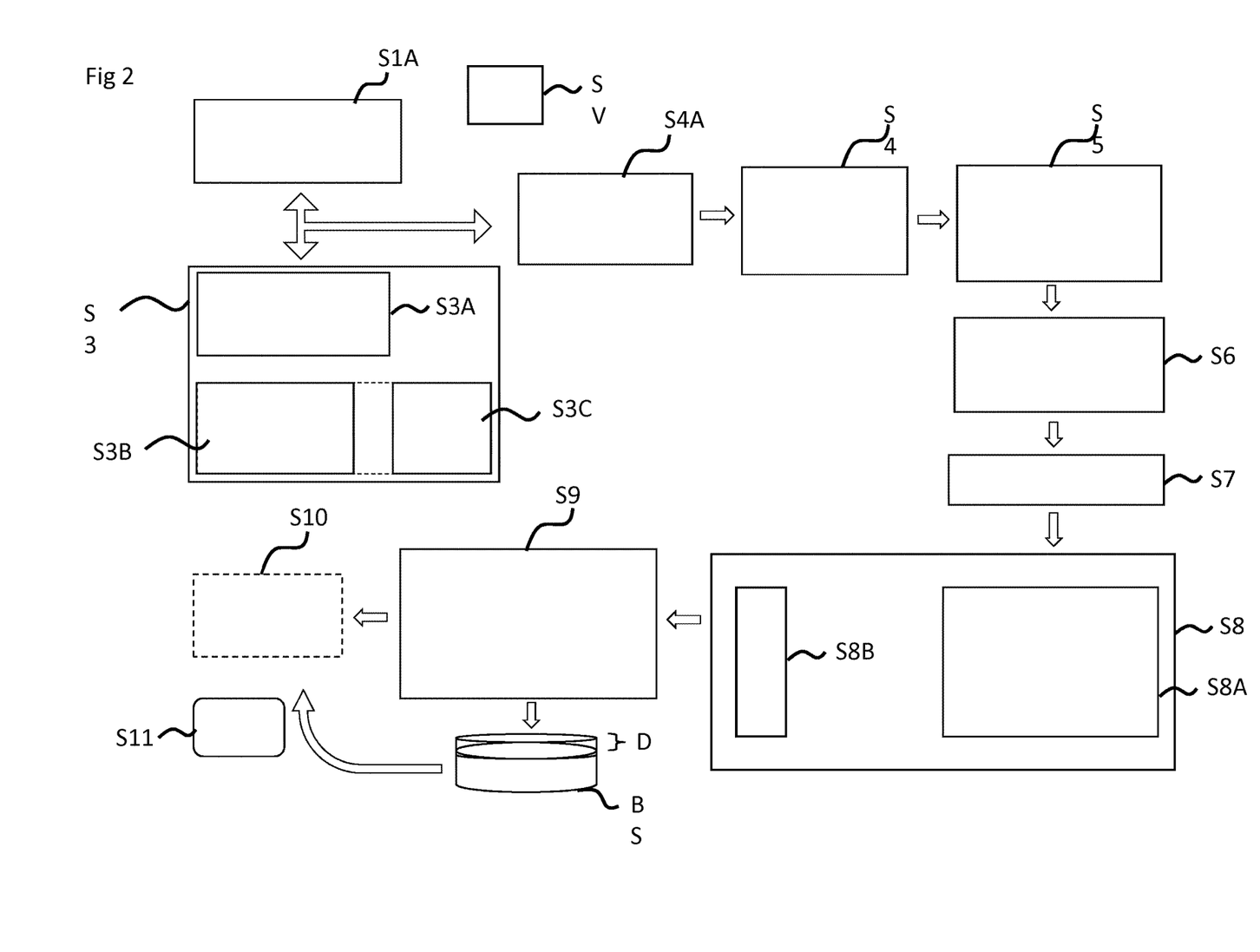
FIG. 2 shows a flowchart of a second example of a program for encoding and decoding.
Figure 3:
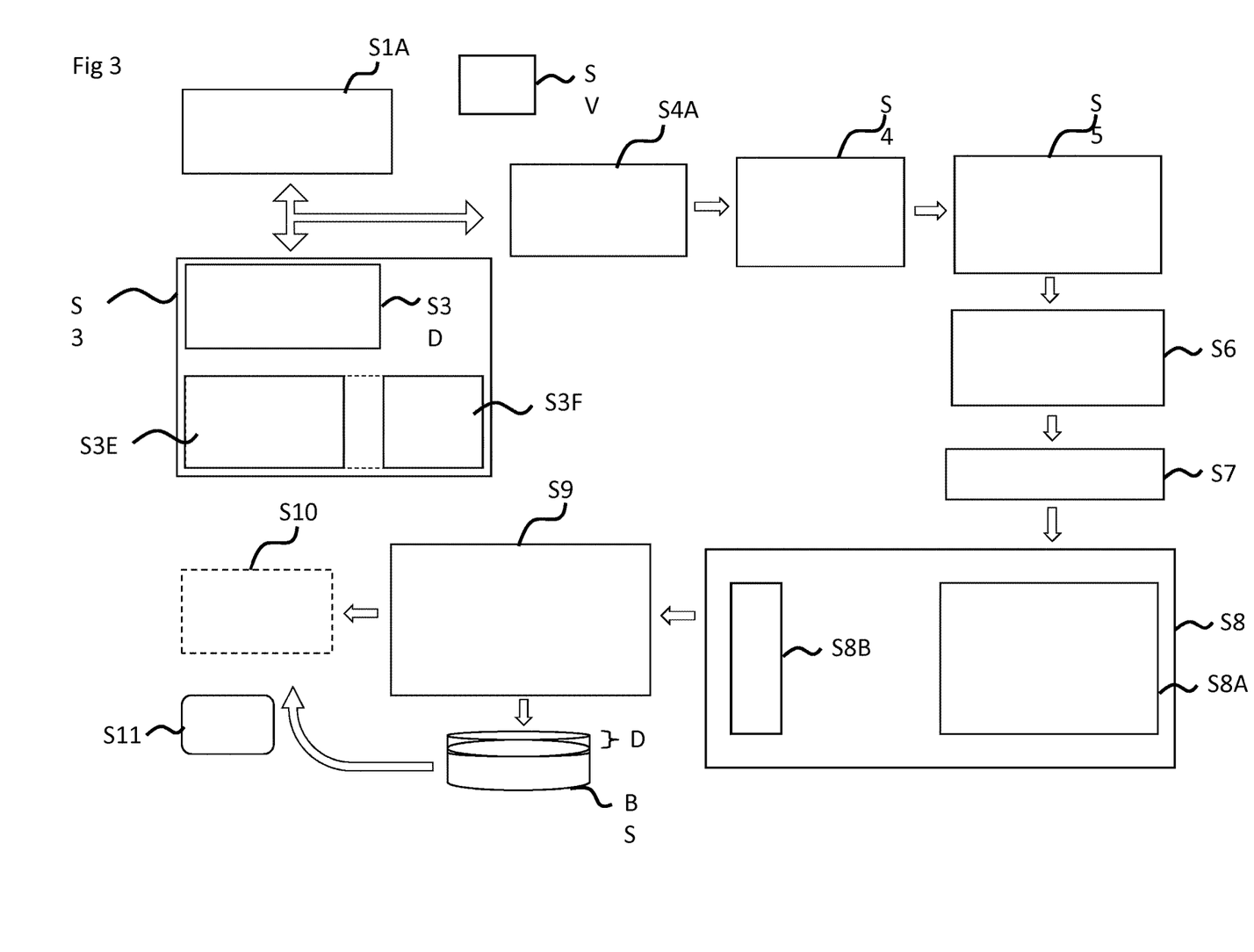
FIG. 3 shows a flowchart of a third example of a program for encoding and decoding.

FIGS. 1 to 3 show flowcharts of a program for encoding and decoding. The program can be processed, for example, by means of a vehicle control device SV which has, in particular, at least one computer unit, one program and data memory as well as, for example, one or more communication interfaces and which is arranged in a vehicle. The program and data memory and the computer unit of the vehicle control device can be installed in one component and/or distributed among a plurality of components.

The program can, for example, alternatively or additionally be run by means of an external control device which has, in particular, at least one computer unit, one program and data memory as well as, for example, one or more communication interfaces and which is arranged, for example, in a server, in particular a backend server BS, and/or a further vehicle. The program and data memory and the computer unit of the external control device can be embodied in one component and/or distributed among a plurality of components.

The program can also be run in a distributed fashion by means of the vehicle control device SV and the external control device. It is therefore possible, in particular, for data to be determined in the vehicle control device SV, and transmitted to the external control device and further processed there.

A system for encoding and/or decoding therefore comprises, in particular, the vehicle control device SV and/or the external control device.

After the starting of the program, the program is continued in a step S1 after, for example, variables have been initialized.

In the step S1, variables in the vehicle, in particular functional parameters and/or input variables and/or internal variables and/or output variables, are acquired.

Optionally (examples in FIGS. 2 and 3), position information which is representative of a global and/or relative position of the vehicle, e.g. of the position within the lane, relative to the markings/roadway boundaries, is additionally determined in a step S1a.

In a step S3, change data of a change in the acquired variables is determined.

In the first example and second example (FIG. 1 and FIG. 2), a corresponding change function for this is determined according to time, such as representation for example as a time function or for example in the form of traces (step S3a).

Alternatively or additionally, the change data is determined in relation to spatial information (distance values) or specific position information along a route (step S3b).

Alternatively or additionally, the change data of a first variable is determined in relation to a second variable (step S3c).

In a third example (FIG. 3), in particular in a step S3D (FIG. 3), for example one or more variables in the vehicle which characterize the current surroundings of the vehicle (or a condition in the surroundings of the vehicle) are recorded. In particular, a variable can characterize an interaction of the vehicle with an object in its surroundings. Such a variable can be determined on the basis of the data which is determined with an external sensor system of the vehicle, for example on the basis of the data of a stereo camera, of a laser scanner or of a radar system.

Alternatively or additionally, for example one or more vehicle-internal variables (which are not, or not directly, associated with the external world) are determined for this in a step S3E. These variables may characterize one or more physical and/or chemical processes. For example, the one or more variables can characterize a physical and/or chemical process in connection with an energy conversion process in the vehicle, e.g. of a petrol engine, of a diesel assembly, of a battery (traction battery) of the vehicle. Therefore, (otherwise extremely sensitive) data characterizing analog processors can be handled efficiently.

Alternatively or additionally, for example a first variable and/or a second variable characterizing an influence on the vehicle is determined for this in a step S3E, e.g. determined in the course of a driving operation. For example, one or more variables characterizing accelerations and/or forces acting on the passenger cell or individual parts of the vehicle, e.g. axles of the vehicle, can be determined and processed.

Alternatively or additionally, the change data determined in the step S3E is assigned to a variable representing spatial information or converted into a spatial function in a step S3F.

In an optional step S4 of the example 1, 2 and 3, reduced change data is determined on the basis of at least one or more predefined thresholds and on the basis of the change data in that data which is representative of imperceptible physical changes in the one or more variables in the vehicle is filtered out from the change data.

In an optional preceding step S4a of the examples 2 and 3, the change data is transferred into a predefined coordinate system and/or already determined in a predefined coordinate system, for example along and/or transversely with respect to a part or track profile of a section of a route.

In an optional step S5 of the examples 2 and 3, a similarity measure between one or more data sections of the change data with respect to one or more predefined patterns is determined, which data sections are representative of predefined change patterns, and the data sections assigned to one of the predefined patterns in accordance with the determined similarity measure. The predefined patterns comprise, for example, predefined column functions, angular profiles and/or predefined standard potholes.

Alternatively or additionally, data sections are differentiated in the optional step S5a of the example 1 according to use case and are optionally marked (labeled) or encoded.

In an optional step S6 of examples 1, 2 and 3, it is determined whether the change data has repeated and/or similar sequences, and the repeated and/or similar sequences are encoded as a repetition, in particular by application of Huffman coding.

In an optional step S7 of the examples 1, 2 and 3, a vehicle profile is made available and the change data is determined in accordance with the vehicle profile, specifically in such a way that they are representative of the respective variable independently of the vehicle. The step S7 can be processed, in particular, by means of the external control device.

In a step S8 of the examples 1, 2 and 3, a spectral distribution is determined on the basis of the change data and/or the reduced change data.

In this context, the spectral distribution can also be determined for example with respect to a variable, wherein the variable represents spatial information and/or time information.

Alternatively or additionally, the spectral distribution of a first variable, in particular of an output variable, is determined with respect to a second variable, in particular an input variable.

In order to determine the spectral distribution, in particular a Fourier analysis is applied, preferably as a spectral representation of the change data as a spatial function or time function, in a step S8A.

In particular, the determination of the spectral distribution function is carried out by means of time-discrete methods which are known per se and which supply an approximation to the value of the following formula. In this context, a corresponding basic formula of the Fourier analysis based on an integral does not require any variables having global positioning information:

$$a(l) = \frac{1}{\sqrt{2\pi}} \int_{-\infty}^{\infty} f(l) e^{-i\omega t} dl$$

In this example, "l" is the variable which denotes spatial information. This can characterize, for example, distance values, e.g. along a route. However, any other reference variable, e.g. a further variable, for example a purely vehicle-internal variable, is also possible. A reference of the spectral distribution (such as for example in the case of an MP3 track) to time values can, of course, also be made.

In particular, the determination of the spectral distribution takes place in a step S8B by means of application of a location-discrete cosine transformation.

In an optional step S9, the spectral distribution is permanently stored, for example in the vehicle and/or in the backend server BS. A comparison with existing data is preferably carried out and only difference data D which differs from the already present data is stored.

In an optional step S10, the spectral distribution can be used, for example, for vehicle functions.

In one step S11, the spectral distribution is decoded again by determining, in accordance with the spectral distribution, change data which is assigned to the spectral distribution and is representative of a change in one or more variables in the vehicle, in particular functional parameters and/or input variables and/or internal variables and/or output variables.

In this context, in this example a step (not illustrated) of the assignment of the decoded variable component of the change data to a reference variable is carried out. The reference variable is here the reference variable which is determined during the encoding or a reference variable which is determined with means of a second vehicle. The reference variable can also be a global variable.

The spectral distribution or spectral distribution function can be stored here together with the position information assigned to it and, if appropriate, also the function of the reference variable as data packets and can be used at a significantly later time.

In this context, on the basis of the data packets the change data can be determined with respect to predetermined position information or position information can be obtained with respect to predefined route profile data.

The method can also comprise the determination of one or more position information items which comprise a specific pattern or a pattern of a specific type that is formed by local physical work roadway properties. In this context, such patterns can particularly preferably comprise different classes of the change data.

In summary, the following examples can be implemented by means of the methods described above:

Example 1

For example, the change data can be aggregated with one another in the form of respective spectral distribution functions according to the position information from a plurality of vehicles or after decompression. Specifically, if the spectral distribution or the Fourier transformation is not calculated according to time but rather according to position information, data from any desired number of vehicles driving in any desired different way can be compared with one another or combined with one another by calculation.

Example 2

For example, the change data can be added as spectral distributions or spectral distribution functions to a (learning) map. In this context, a function of the change of one or more variables in the vehicle can be assigned to the map data. The assignment can be used for the evaluation for the further development of the vehicles or vehicle functions. It is also possible for them to be used to avoid the same side effects in the same or similar regions of the roadway.

Example 3

The change data which is transformed as spectral distribution can also be read in by further vehicles (in turn when travelling along the route) and used for the vehicle function. This is largely possible in real time because the data volume of the spectral distributions is very much smaller than the original data of, for example, an amplitude function. For example, a vehicle function can read in the information which represents what happened there with other vehicles.

Example 4

The spectral distributions or spectral distribution functions from one or more vehicles can be used for machine learning. In this context at least one vehicle function of a vehicle (one or more "user vehicles") can be influenced, e.g. pre-conditioned or controlled, on the basis of a plurality of spectral distributions of earlier vehicles (of a plurality of "data-supplying vehicles").

Example 5

A function of an output variable (of one or more corresponding variables) of a vehicle function can be formed from the input variable (of one or more corresponding variables). In this context, the Fourier analysis, e.g. a modified time-discrete cosine transformation (MIDCT) can be executed according to the input variable. The result therefore has an extremely compressed form. Despite a very small data volume, the statement contained therein about the method of functioning of the vehicle function is very largely included.

In this context, (extremely compact) learning data can be determined and handled. For example, data in this form can also be transferred to the vehicle.

This data based on one or more spectral distributions can be transferred or streamed essentially in real time, e.g. from/to an infrastructure device or car-to-car. This data can therefore be used, for example, in real time (extremely valuably) to operate, e.g. to parameterize, pre-condition or control, a vehicle function.

LIST OF REFERENCE SYMBOLS

BS Backend server
D Difference data
SV Vehicle control device

What is claimed is:

1. A method for processing data in connection with a vehicle, comprising:
   determining change data characterizing a change in one or more variables in the vehicle,
   determining a spectral distribution function on the basis of the acquired change data of the one or more variables, in the vehicle, and
   providing the change data on the basis of the determined spectral distribution to use outside of the vehicle,
   wherein the change data comprises a function of the one or more variables based on a variable representing time, a variable representing space, and a variable representing one or more events, wherein at least one of the one or more variables characterizes an energy conversion process of a traction battery in the vehicle, and
   wherein the change data characterizes a mathematical relationship between gradients of at least two different variables in connection with a vehicle functionality.

2. The method according to claim 1, wherein the one or more variables in the vehicle are characteristic of one or more of an operating parameter, an input variable, an internal state, and an output variable of a functionality of the vehicle.

3. The method according to claim 1, wherein the spectral distribution of a first variable in the vehicle is determined in relation to a second variable in the vehicle.

4. The method according to claim 3, wherein
   the at least one first variable characterizes an output variable, and
   the at least one second variable characterizes an input variable of at least one functionality.

5. The method according to claim 1, wherein
   the one or more variable relates to a parameter characterizing an operator control action of the driver of the vehicle relating to a specification for a movement of the vehicle.

6. The method according to claim 1, wherein
   the determination of the spectral distribution function is carried out within the scope of a predefined audio standard.

7. The method according to claim 1, wherein
   the spectral distribution is determined such that it represents multi-channel data, and
   one channel of the multi-channel data is representative of a change in a first variable and one channel of the multi-channel data is representative of a change in a second variable.

8. The method according to claim 1, wherein
   the determination of the spectral distribution is carried out within the scope of a predefined video standard.

9. The method according to claim 1, wherein
   reduced change data is determined on the basis of at least one or more predefined thresholds in that data which is representative of less relevant physical changes in the one or more variables is removed from the change data or replaced by a predefined value, and
   the spectral distribution is determined on the basis of the reduced change data.

10. The method according to claim 1, wherein the variable is a trace of an on-board power system of the vehicle.

11. The method according to claim 1, wherein the variable is an operating variable in a driver assistance function.

12. The method according to claim 1, wherein the variable is a wheel slip of at least one wheel of the vehicle.

13. A decoding method comprising:
    streaming a spectral distribution on the basis of change data of at least one vehicle, and
    determining, on the basis of the spectral distribution, the change data that is assigned to the spectral distribution and representative of a change in one or more of functional parameters, input variables, internal, and output variables, wherein the change data comprises a function of the one or more variables based on a variable representing time, a variable representing space, and a variable representing one or more events, wherein at least one of the one or more variables characterizes an energy conversion process of a traction battery in the vehicle, and wherein the change data characterizes a mathematical relationship between gradients of at least two different variables in connection with a vehicle functionality.

14. An encoding and decoding method comprising:
performing the method of claim 1,
streaming the spectral distribution, and
determining, on the basis of the spectral distribution, the change data that is assigned to the spectral distribution and which is representative of a change in one or more of functional parameters, input variables, internal variables, and output variables.

15. The encoding and decoding method according to claim 14, wherein the spectral distribution is provided to a second vehicle as a stream.

16. The encoding and decoding method according to claim 15, further comprising:
aggregating the spectral distributions of a plurality of first vehicles, and
providing data on the basis of the aggregated spectral distributions for one or more second vehicles.

17. A system comprising:
a processor;
a memory in communication with the processor, the memory storing a plurality of instructions executable by the processor to cause the system to:
perform the method of claim 1.

18. The system according to claim 17, further comprising:
a device to compress audio or video data of a predefined audio or video format that is designed to process the change data.

19. A non-transitory computer-readable medium comprising instructions operable, when executed by a data processing device, to:
perform the method of claim 1.

* * * * *